Jan. 7, 1936. F. W. KRANZ Re. 19,808

VIBRATION INSTRUMENT FOR BONE AUDITION

Original Filed March 29, 1923

INVENTOR
F. W. Kranz
BY
Cromwell, Greist & Warden
ATTORNEY

Reissued Jan. 7, 1936

Re. 19,808

UNITED STATES PATENT OFFICE 19,808

VIBRATION INSTRUMENT FOR BONE AUDITION

Frederick W. Kranz, Fort Wayne, Ind., assignor, by mesne assignments, to Sonotone Corporation, New York, N. Y., a corporation of New York Original No. 1,540,783, dated June 9, 1925, Serial No. 628,683, March 29, 1923. Application for reissue July 1, 1933, Serial No. 678,699

1 Claim. (Cl. 179—107)

This invention relates to bone vibrators by which a person who is deaf or partially deaf to ordinary air vibration may be made to hear by means of vibrations conducted through his bones.

An object of the present invention is to produce an instrument for use in the investigation of the hearing through the bones by persons who are deaf to ordinary air vibration. The instrument, however, can also be used to investigate bone audition in cases where the air audition is normal.

It is a further object of this invention to provide an instrument of the sort indicated which will itself produce very little vibration in the air, so that it is available for investigations of the sort just mentioned and also for investigations of the hearing of lower animals, fish and the like.

It is a further object of the invention to provide an instrument by which alternating electric current either of a constant period or of the character of the usual telephone currents may be translated into mechanical vibrations which can be transmitted through the bones of a person to his hearing nerves.

It is a further object of this invention to provide instruments of the kind indicated which shall produce vibrations of small amplitude but large force.

It is a further object of the invention to provide an instrument of the sort indicated whose efficiency will not be materially diminished by pressing the instrument against the person of the subject.

Other and further important objects of this invention will be apparent from the disclosures in the specification and the accompanying drawing, in which Figure 1 is a top plan view of a vibrator of one form of my invention.

Figure 1:
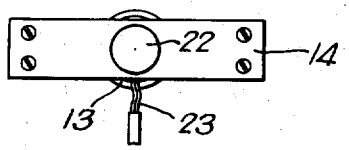
Figure 2:
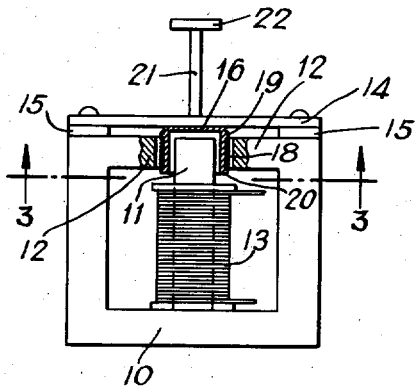
Figure 2 is a side view, partially in section, of the vibrator of Figure 1.
Figure 3:
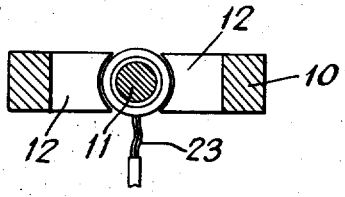
Figure 3 is a sectional view along line 3—3 of Figure 2.

The vibrator instrument shown in Figures 1 to 3 includes an iron core 10 having a central core member 11 and lateral pole pieces 12 which extend toward the end portion of said central core member and are spaced therefrom by a small air gap. The central core member 11 carries a winding 13 which is supplied with direct current in any convenient way. If desired, instead of the winding 13 supplied with direct current, the central member 11 may be a permanent magnet.

A diaphragm bar 14 of any elastic non-magnetic material, such as brass or hard rubber or the like, is secured across the core 10 above the air gap, spaced away from the magnetic core 10 by spacer blocks 15 of non-magnetic material. In the center of its under face the bar 14 carries a spool 16 extending down into the air gap. This spool is of non-magnetic material such as porcelain, hard rubber, or the like. Preferably also it is of insulating material in order that Foucault currents may not be created therein.

An actuating coil 18 is held in place upon this spool by flanges 19 and 20, and extends into the gap around the upper end of the central core member 11 of the magnetic core 10.

As illustrated, the upper end of the hollow in the spool is closed to make a solid floor for connection with the bar 14. It will, however, be obvious that any method for connecting the spool to the bar may be used.

To the center of the upper surface of the bar 14 opposite the middle of the spool 16, is secured a rod 21 which supports a disk 22, preferably of hard rubber, in order that it may be pressed against the bone structure of a person to whom hearing is to be imparted, without discomfort. Oscillatory current is supplied to coil 18 through flexible leads 23 not interfering with the motion of the coil 18.

In using the form of the bone vibrator shown in Figures 1 to 3, sound-frequency current oscillations are passed by leads 23 through winding coil 18. This oscillatory current may be of a constant frequency such as would be obtained from a vacuum tube oscillator, and the frequency may be adjusted in the usual way by variable condensers or inductances. The current for coil 18 may also be supplied by the receiving set of a wireless telephone outfit, or from the receiving instrument of an ordinary telephone line. The current oscillations for coil 18 may further be supplied from the microphone of a telephone receiving device such as is frequently used in outfits for enabling deaf people to hear.

Any form of sound-frequency current may be used for coil 18 no matter what sort of apparatus is needed to produce this alternating current. The alternating current flowing in coil 18 will under the action of the magnetic field produced in the surrounding gap by the exciting coil 13 or by the permanent magnetism of core 10, impart strong up and down impulses to the coil 18 and thus exert a thrust first up and then down against the bar 14 which will be transmitted through the rod 21 to the disk 22, imparting to it a vibratory movement corresponding to the impressed oscillatory currents.

By pressing the contact surface of disk 22 against the mastoid bone, the teeth or other sound conducting bone portion of a hearer's person, these vibrations of the bar 14 are transferred to the bone structure of the hearer and therethrough to the internal ear, inducing therein corresponding hearing sensations. Because of the narrow shape of the bar 14, the vibrating system has but little surface in contact with the air. Very little vibration in the air itself will therefore be set up. For this reason, when the instrument is used in connection with a telephone receiving device and a microphone such as are frequently used in outfits for enabling deaf people to hear, the tendency of the outfit to sing or howl will be much less than with such outfits as heretofore made.

Figure 4:
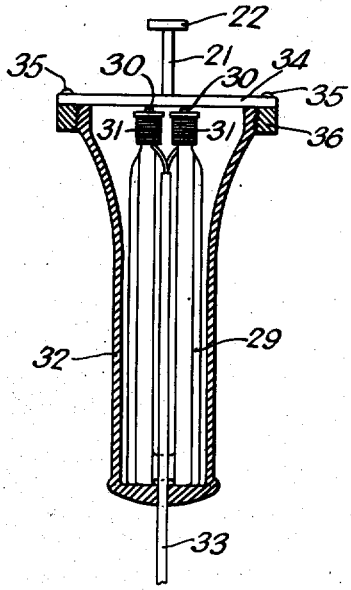
Figure 4 is a central section of a vibrator of another form of the invention.
Figure 5:
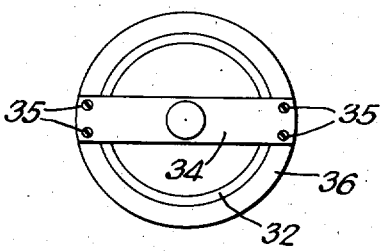
Figure 5 is an end view of the vibrator form shown in Fig. 4.

In the form of the vibrator device illustrated in Figures 4 and 5, a permanent magnet 29 has pole pieces 30 surrounded by windings 31. These windings and the permanent magnet core are enclosed within a casing 32 of hard rubber or the like, and leads from the windings 31 are brought out of the casing as shown at 33; all of this structure being closely similar to that of the usual telephone receiver. Instead of a diaphragm, as in the usual telephone receiver, a diaphragm bar 34 of magnetic material is placed across the open end of the casing 32 in close proximity to the pole pieces of the magnet 29. To the center of the bar 34 is connected by a rod 21 a disk 22, of hard rubber or like material, to be pressed against the bone structure of a person to whom hearing is to be imparted. This bar is made of a thickness considerably greater than that of a telephone diaphragm, in order that when the contact surface of disk 22 of bar 34 is pressed against the bone structure of the hearer, the distance from the bar 34 to the pole pieces 31 shall be altered only slightly. The bar is firmly secured in place in any desired manner; for example, it may be fastened by screws 35 to a ring 36 and the ring screw-threaded onto the casing 32. This permits adjustment of the bar to bring it into close proximity to the pole pieces.

The vibrator shown in Figures 4 and 5 has a magnetic core structure of a standard telephone receiver for producing a permenent magnetic flux which flows through the core 29 passing over the magnet bar and the gaps from one pole piece to the other. To operate the device, electric sound-frequency current oscillations are sent through the windings 31 around the pole pieces, causing variations of the magnetic field in the gaps between the faces of the pole pieces 30 and the bar. These variations of the magnetic field causes variations of the attraction exerted by the core on the elastic bar, and impart to the bar vibrations corresponding to the supplied current oscillations. The vibrations are transmitted from the bar 34 over contact disk 22 to the bone structure of the hearer's body and induce hearing in his internal hearing organs.

In pressing against the person of the hearer, the bar 34 will be slightly deflected toward the pole pieces of the magnet core 29, but the bar is made of sufficient thickness so that this deflection is not large enough to change the efficiency of the instrument. This rigidity of the vibrating member allows the air gap between it and the magnetic pole pieces to be made small, with a consequent gain in the amount of force exerted on the vibrating member.

As a result the stiff diaphragm bar vibrates with large forces and small amplitudes and is able to impart to the bone structure of the user the vibratory energy required to induce satisfactory hearing.

I am aware that numerous details of construction may be varied through a wide range without departing from the principles of this invention, and I therefore do not purpose limiting the patent granted otherwise than necessitated by the prior art.

I claim as my invention:

In a bone audition vibrating apparatus for translating sound-frequency alternating currents into hearing-inducing mechanical vibrations imparted to hearing-inducing bone structure of a person, a magnetic core structure having a pole face for producing a continuous magnetic field flux concentrated in an air space adjoining said pole face, an elastic diaphragm bar having an intermediate portion disposed adjacent said pole face, means for clamping the ends of said diaphragm bar on the opposite sides of the intermediate portion thereof relatively to said core structure, means including windings for applying sound-frequency alternating currents to produce in combination with the flux in the air space adjoining said pole face corresponding vibratory forces imparting vibrations to the intermediate portion of said diaphragm bar, and contact means actuated by the intermediate portion of said diaphragm bar for mechanically coupling the intermediate portion of said diaphragm bar to hearing-inducing bone structure of a person and transmitting hearing-inducing vibratory forces to said bone structure, the stiffness of said diaphragm bar being sufficiently large and the area of said diaphragm bar in contact with the air being sufficiently small to minimize to a negligible value the vibrations of the air caused by said vibrations while imparting with said vibrations to said bone structure sound vibrations of small amplitude and large force inducing by bone conduction audible sound in the internal ear organs of the person.

FRED. W. KRANZ.